United States Patent
Hughes et al.

(10) Patent No.: US 7,112,761 B2
(45) Date of Patent: Sep. 26, 2006

(54) HAND-HELD LASER WELDING WAND GAS LENS

(75) Inventors: Thomas M. Hughes, Greer, SC (US); Clyde R. Taylor, Laurens, SC (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 11/053,319

(22) Filed: Feb. 7, 2005

(65) Prior Publication Data

US 2006/0175308 A1    Aug. 10, 2006

(51) Int. Cl.
B23K 26/14  (2006.01)
B23K 26/20  (2006.01)

(52) U.S. Cl. ............... 219/121.84; 219/121.63
(58) Field of Classification Search ........... 219/121.63, 219/121.64, 121.84
See application file for complete search history.

(56) References Cited

U.S. PATENT DOCUMENTS

| | | | |
|---|---|---|---|
| 2,074,629 A | 3/1937 | Ungar | |
| 3,392,897 A | 7/1968 | Siegel | |
| 4,564,736 A | 1/1986 | Jones et al. | |
| 4,682,855 A | 7/1987 | Honda et al. | |
| 4,705,036 A | 11/1987 | Hughes et al. | |
| 4,803,335 A | 2/1989 | Steen et al. | |
| 4,804,815 A | 2/1989 | Everett | |
| 5,418,350 A * | 5/1995 | Freneaux et al. | 219/121.84 |
| 5,477,025 A | 12/1995 | Everett et al. | |
| 5,556,560 A | 9/1996 | Ahola et al. | |
| 5,837,960 A | 11/1998 | Lewis et al. | |
| 5,869,805 A | 2/1999 | Beyer et al. | |
| 5,871,521 A | 2/1999 | Kaneda et al. | |
| 5,993,550 A | 11/1999 | Eloy | |
| 6,288,358 B1 | 9/2001 | Dulaney et al. | |
| 6,320,689 B1 | 11/2001 | Nakata et al. | |
| 6,526,863 B1 | 3/2003 | Torres | |
| 6,774,338 B1 * | 8/2004 | Baker et al. | 219/121.64 |
| 2004/0016726 A1 * | 1/2004 | Renteria et al. | 219/121.63 |
| 2005/0056628 A1 * | 3/2005 | Hu | 219/121.84 |
| 2005/0109744 A1 * | 5/2005 | Baker et al. | 219/121.84 |

FOREIGN PATENT DOCUMENTS

JP          61-229491 A  * 10/1986  ............ 219/121.84

* cited by examiner

Primary Examiner—Geoffrey S. Evans
(74) Attorney, Agent, or Firm—Ingrassia Fisher & Lorenz

(57) ABSTRACT

A hand-held laser-welding wand includes a gas lens assembly that develops an inert gas atmosphere around a weld pool. The lens assembly additionally reflects laser light and thermal radiation that is reflected off a work piece surface away from the hand of a user of the hand-held laser welding wand.

36 Claims, 9 Drawing Sheets

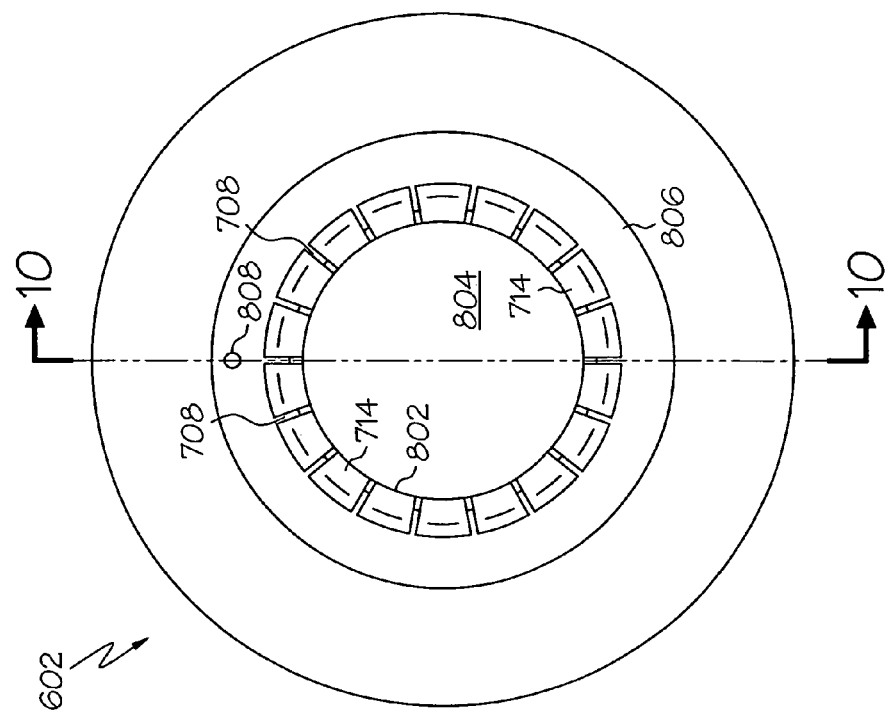
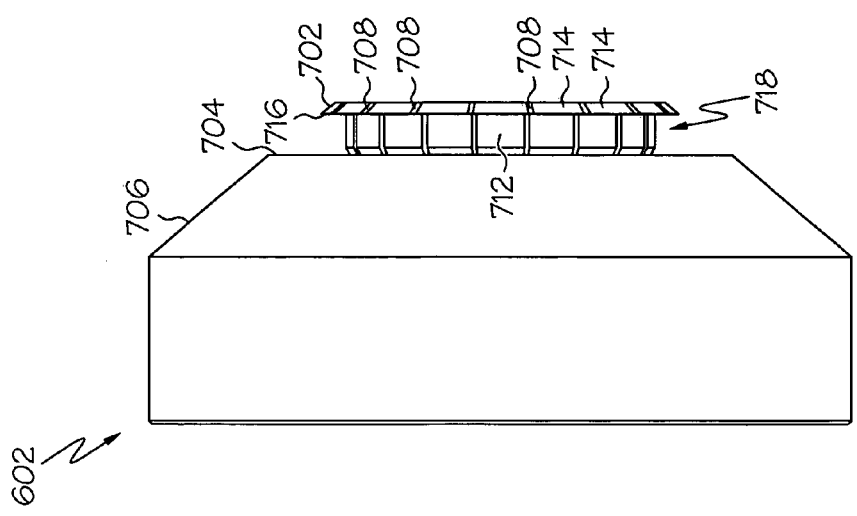

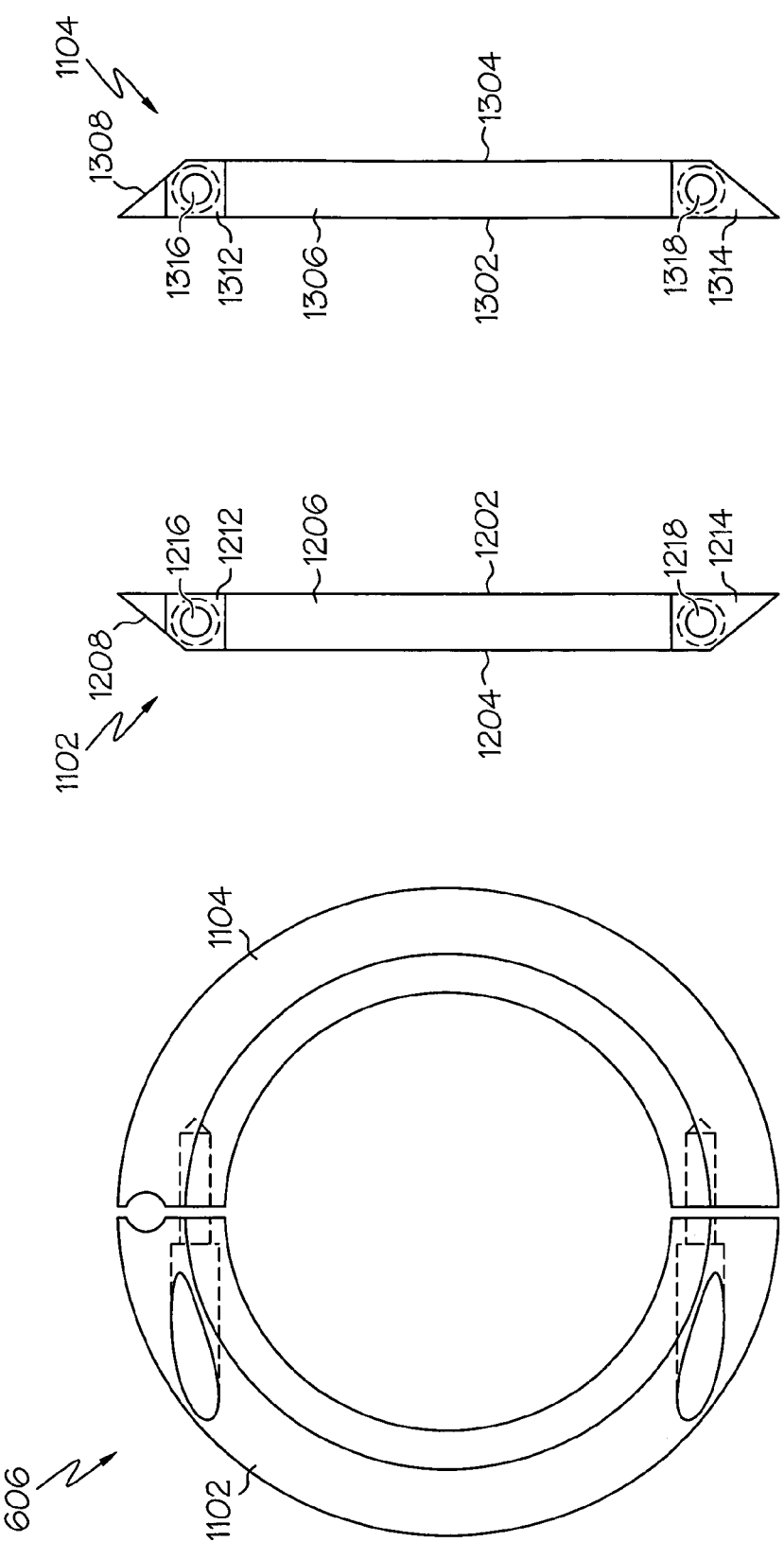

HAND-HELD LASER WELDING WAND GAS LENS

FIELD OF THE INVENTION

The present invention relates to laser welding and, more particularly, to a hand-held laser welding wand that includes a gas lens.

BACKGROUND OF THE INVENTION

Many components in a jet engine are designed and manufactured to withstand relatively high temperatures. Included among these components are the turbine blades, vanes, and nozzles that make up the turbine engine section of the jet engine. In many instances, various types of welding processes are used during the manufacture of the components, and to repair the components following a period of usage. Moreover, various types of welding technologies and techniques may be used to implement these various welding processes. However, one particular type of welding technology that has found increased usage in recent years is laser welding technology.

Laser welding technology uses a high power laser to manufacture parts, components, subassemblies, and assemblies, and to repair or dimensionally restore worn or damaged parts, components, subassemblies, and assemblies. In general, when a laser welding process is employed, laser light of sufficient intensity to form a melt pool is directed onto the surface of a metal work piece, while a filler material, such as powder, wire, or rod, is introduced into the melt pool. Until recently, such laser welding processes have been implemented using laser welding machines. These machines are relatively large, and are configured to run along one or more preprogrammed paths.

Although programmable laser welding machines, such as that described above, are generally reliable, these machines do suffer certain drawbacks. For example, a user may not be able to manipulate the laser light or work piece, as may be needed, during the welding process. This can be problematic for weld processes that involve the repair or manufacture of parts having extensive curvature and/or irregular or random distributed defect areas. Thus, in order to repair or manufacture parts of this type, the Assignee of the present application developed a portable, hand-held laser welding wand. Among other things, this hand-held laser welding wand allows independent and manual manipulation of the laser light, the filler material, and/or the work piece during the welding process. An exemplary embodiment of the hand-held laser welding wand is disclosed in U.S. Pat. No. 6,593,540, which is entitled "Hand Held Powder-Fed Laser Fusion Welding Torch," and the entirety of which is hereby incorporated by reference.

The hand-held laser welding wand, such as the one described above, provides the capability to perform manual 3-D adaptive laser welding on components. However, in its present configuration the welding wand is, in many instances, used within an enclosed chamber that provides an inert atmosphere. This is because many of the materials that are welded using the hand-held wand need to be in an inert atmosphere when being welded. While such an arrangement is possible in most cases, it may present an inconvenience in certain instances. For example, it may be needed or desired to conduct a particular weld repair operation at a time or place where an enclosed inert chamber may not be available or there may not be sufficient room to provide such a chamber.

In addition to the above, because an operator holds the wand while welding a work piece, the operator's hand may be in close proximity to the work piece. When the laser light impinges on the work piece, some of the laser light may be reflected back toward the operator's hand. Moreover, some thermal radiation that is generated during the weld process may be transmitted back toward the wand and/or the operator's hand. Although the operator may likely wear gloves or other hand covering that is substantially impervious to laser light, it would be desirable to provide an additional barrier between the operator's hand and the reflected laser light.

Hence, there is a need for a device that will provide an inert atmosphere, at least at the weld pool, during welding operations with the hand-held laser welding wand, without having to provide or construct an enclosed chamber. There is additionally a need for a shield that will reflect laser light that is reflected off a work piece surface away from the hand of a hand-held laser welding wand user and/or a shield that will reflect the thermal radiation transmitted from the work piece toward the wand during the weld process. The present invention addresses one or more of these needs.

SUMMARY OF THE INVENTION

The present invention provides a gas lens for a hand-held laser welding wand that creates an inert gas atmosphere at the weld pool on a work piece that is being welded. The gas lens also functions as a shield that will reflect laser light reflected off a work piece surface away from the hand of a user of the hand-held laser welding wand, and that will reflect the thermal radiation transmitted from the work piece toward the wand during the weld process.

In one embodiment, and by way of example only, a hand-held laser fusion welding assembly for treating a workpiece includes a main body, a nozzle, and a gas lens. The main body is dimensioned to be grasped by a hand and is adapted to couple to at least a laser delivery system. The nozzle is coupled to the main body and has an aperture through which laser light from the laser delivery system may pass. The gas lens is coupled to the main body and surrounds at least a portion of the nozzle. The gas lens is adapted to receive a flow of inert gas from an inert gas delivery system and is configured, upon receipt thereof, to develop an inert gas atmosphere at least adjacent the nozzle aperture.

In another exemplary embodiment, a device for developing an inert gas atmosphere proximate a nozzle that is coupled to an end of a hand-held laser welding wand includes a gas lens. The gas lens is adapted to mount on the hand-held laser welding wand and, when mounted thereon, to surround at least a portion of the nozzle. The gas lens is further adapted to receive a flow of inert gas from an inert gas delivery system and is configured, upon receipt thereof, to develop the inert gas atmosphere.

Other independent features and advantages of the preferred welding wand and gas lens will become apparent from the following detailed description, taken in conjunction with the accompanying drawings which illustrate, by way of example, the principles of the invention.

BRIEF DESCRIPTION OF THE DRAWINGS

FIGS. 7–9 are side, back, and front views of a gas lens that forms part of the gas lens assembly of FIG. 6;

FIG. 11 is a back side view of a clamp that forms a portion of the gas lens assembly of FIG. 6; and FIGS. 12 and 13 are side views of the clamp shown in FIG. 11.

DETAILED DESCRIPTION OF A PREFERRED EMBODIMENT

Figure 1:
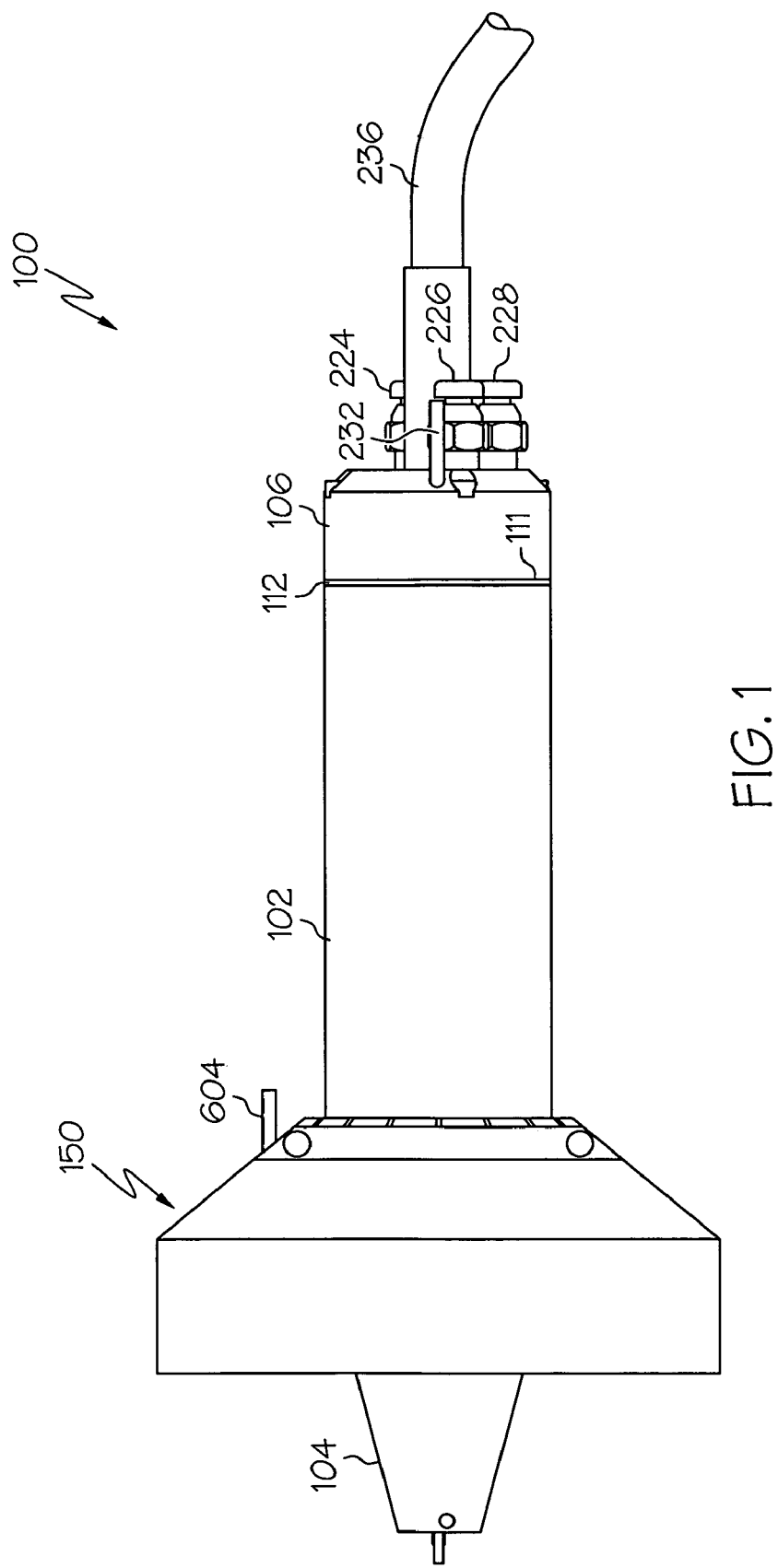
FIG. 1 is a side view of an exemplary hand-held laser welding wand.
Figure 2:
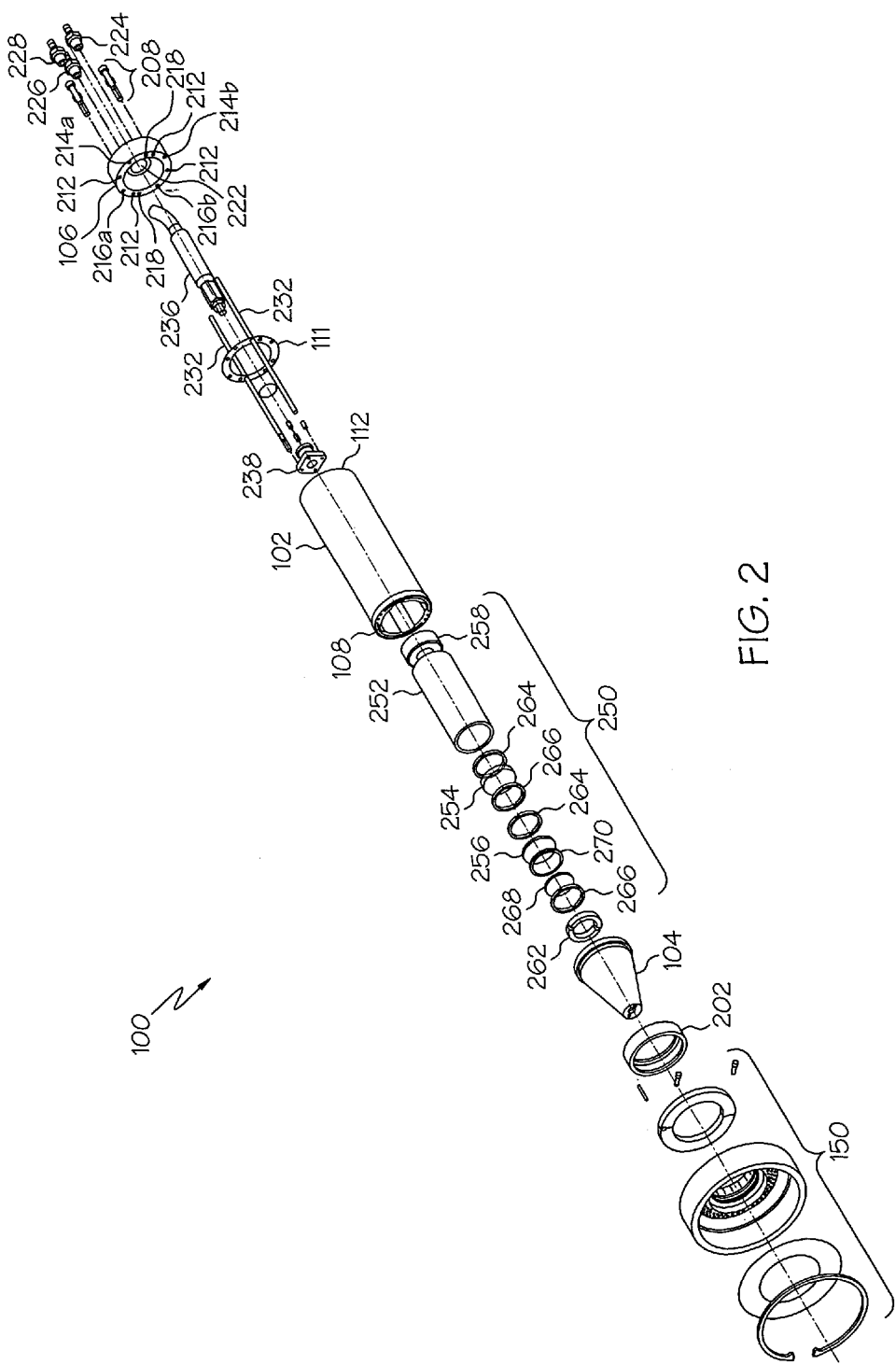
FIG. 2 is a perspective exploded view of the hand-held laser welding wand of FIGS. 1.

Before proceeding with the detailed description, it should be appreciated that the following detailed description is merely exemplary in nature and is not intended to limit the invention or the application and uses of the invention. Furthermore, there is no intention to be bound by any theory presented in the preceding background or the following detailed description.

Turning now to the description, and with reference first to FIGS. 1–5, an exemplary hand-held laser welding wand 100 is shown, and includes a main body 102, a nozzle 104, and an end cap 106. The main body 102, which is preferably configured as a hollow tube, includes a first end 108 (see FIG. 2), a second end 112, and a plurality of orifices and flow passages that extend between the main body first and second ends 108, 112. The orifices and flow passages are used to direct various fluids and other media through the main body 102. Included among these media are coolant, such as water, inert gas, such as Argon, and filler materials, such as powder, wire, or liquid. These orifices and flow passages are in fluid communication with orifices and flow passages in the nozzle 104, in the end cap 106, or both. A description of the specific configuration of each of the orifices and flow paths in the main body 102 is not needed. Thus, at least the coolant and gas orifices and flow passages in the main body 102 will not be further described. The main body filler media orifices and flow passages will be mentioned further below merely for completeness of description.

The nozzle 104 is coupled to the main body first end 108 via a threaded nozzle retainer ring 202. More specifically, in the depicted embodiment the main body 102 has a plurality of threads formed on its outer surface adjacent the main body first end 108. Similarly, the nozzle retainer ring 202 has a plurality of threads formed on its inner surface that mate with the main body threads. Thus, the nozzle 104 is coupled to the main body 102 by abutting the nozzle 104 against the main body first end 108, sliding the nozzle retainer ring 202 over the nozzle 104, and threading the nozzle retainer ring 202 onto the main body 102. It will be appreciated that the nozzle 104 could be coupled to the main body first end 108 in a different manner. For example, the nozzle 104 and main body 102 could be configured so that the nozzle 104 is threaded directly onto the main body first end 108.

Figure 3:
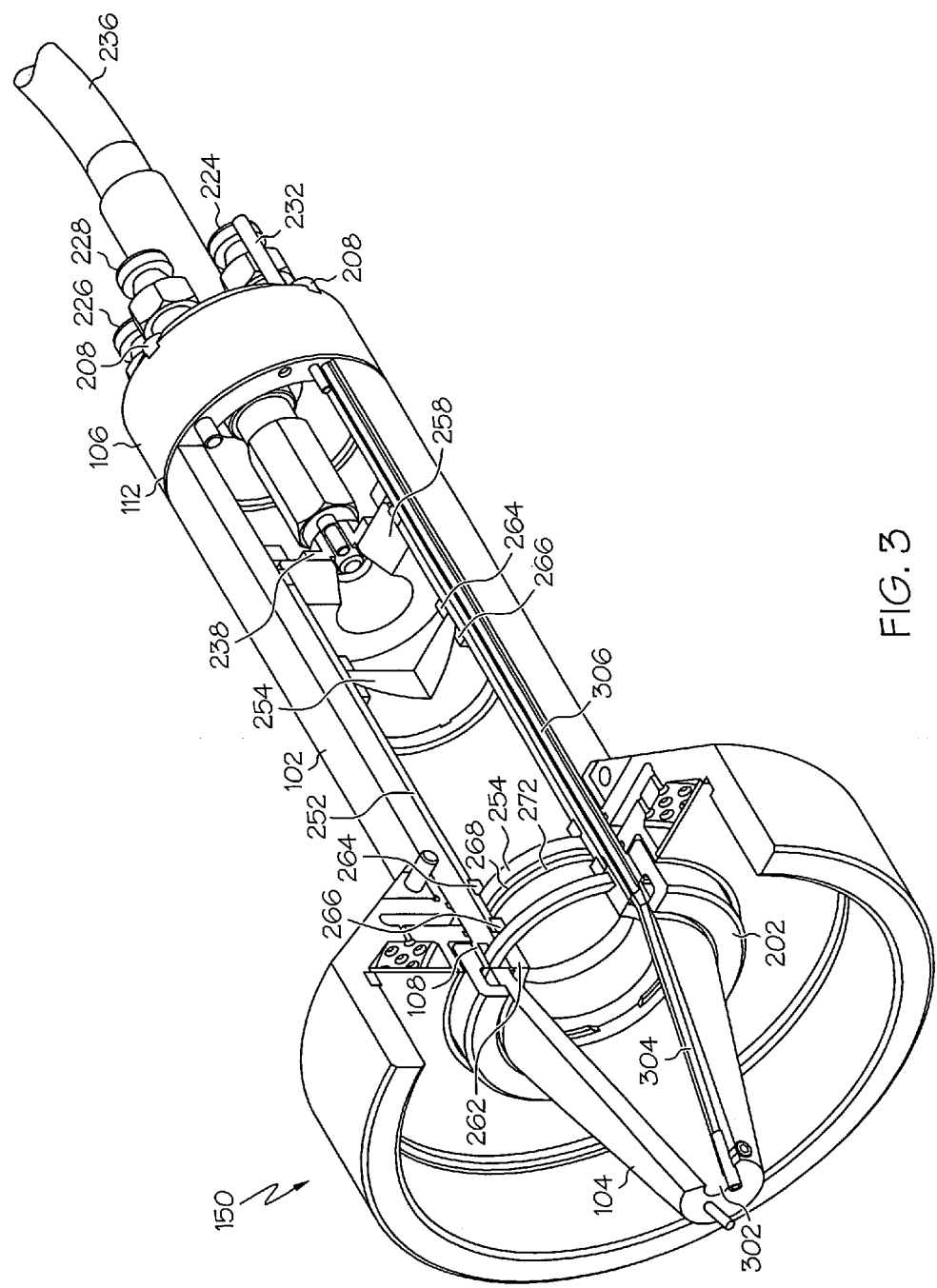
FIGS. 3–5 are partial cut-away perspective views of the hand-held laser welding wand shown in FIGS. 1 and 2.
Figure 4:
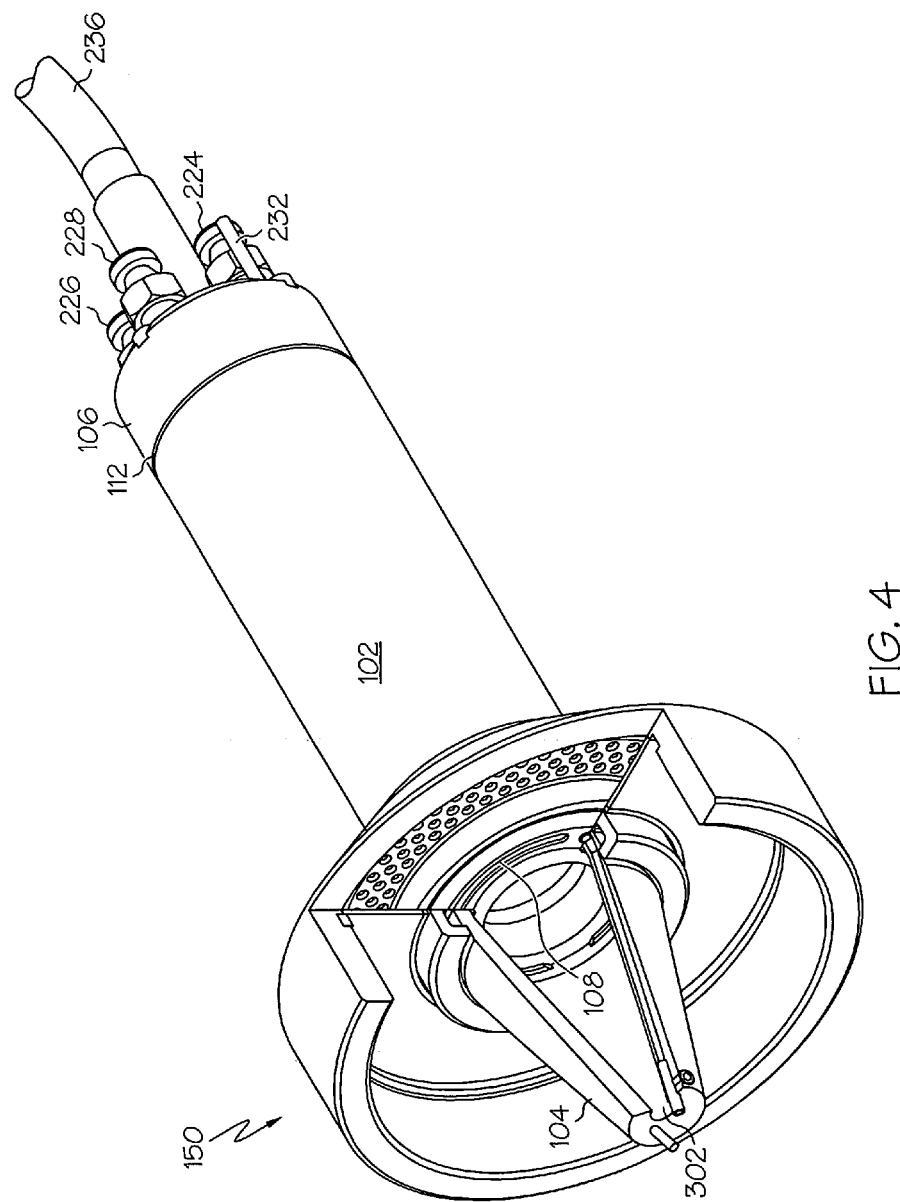
Figure 5:
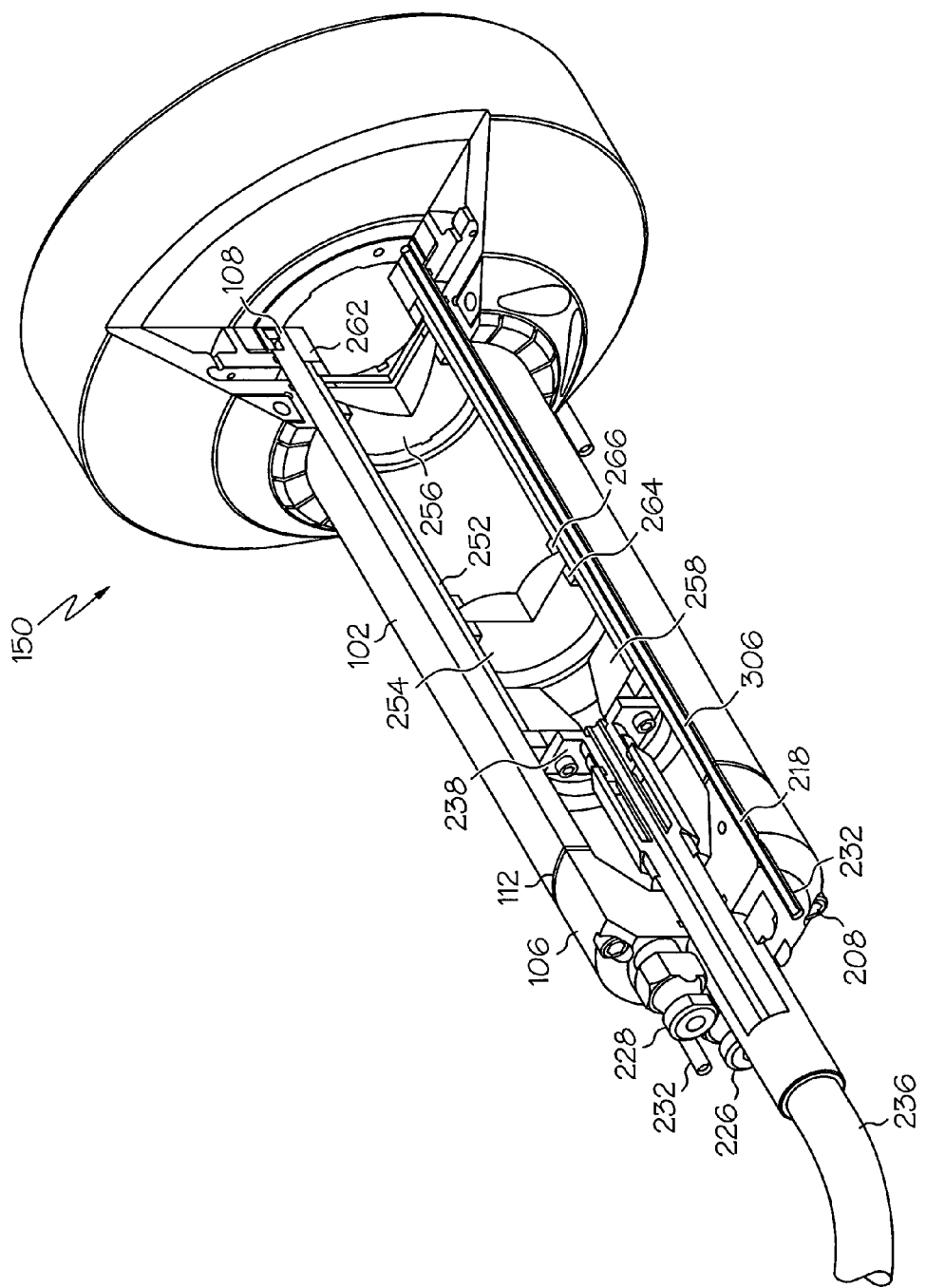

With reference to FIG. 3, it is seen that the nozzle 104 includes an aperture 302 that extends through the nozzle 104. When the nozzle 104 is coupled to the main body 102, the nozzle aperture 302 is in fluid communication with the inside of the hollow main body 102. It is through this aperture 302 that laser light and gas pass during laser welding operations. The nozzle 104 additionally includes a plurality of filler media flow passages 304. The nozzle filler media flow passages 304 pass through the nozzle 104 and are in fluid communication with filler media delivery flow passages 306 that extend through the main body 102. The filler media delivery flow passages 304, 306 are used to deliver a filler media to a work piece (not shown).

The end cap 106 is coupled to the main body second end 112 via a gasket 111 and a plurality of end cap fasteners 208. In particular, the end cap fasteners 208 extend, one each, through a plurality of end cap fastener openings 212 (see FIG. 2) formed through the end cap 106, and into the main body second end 110. In addition to the end cap fastener openings 212, the end cap 106 also includes two coolant passages 214, 216, a gas supply passage (not shown), a plurality of filler media flow passages 218, and a cable opening 222. The two coolant passages include a coolant supply passage 214 and a coolant return passage 216. The coolant supply passage 214, which splits within the end cap 106 into two supply passages 214a, 214b, directs coolant, such as water, into appropriate coolant flow passages formed in the main body 102. The coolant return passage 216, which also splits within the end cap 106 into two return passages 216a, 216b, receives coolant returned from appropriate coolant flow passages formed in the main body 102.

The non-illustrated gas supply passage directs gas into the main body 102. A barbed fitting 224, 226, 228 is coupled to the coolant supply passage 214, the coolant return passage 216, and the non-illustrated gas supply passage, respectively. These barbed fittings 224, 226, 228 are used to couple the respective openings to hoses or other flexible conduits (not shown) that are in fluid communication with a coolant source or a gas source (neither of which is shown), as may be appropriate.

The end cap filler media flow passages 218 are in fluid communication with the nozzle filler media flow passages 304 via the main body filler media flow passages 306. The end cap filler media passages 218 may be coupled to receive any one of numerous types of filler media including, but not limited to, powder filler and wire filler. The filler media may be fed into the end cap filler media flow passages 218 manually, or the filler media may be fed automatically from a filler media feed assembly (not shown). In the depicted embodiment, a plurality of filler media liner tubes 232 is provided. These filler media liner tubes 232 may be inserted, one each, through one of the end cap filler flow media passages 218, and into the main body filler media flow passages 306. The filler media liner tubes 232 further guide the filler media into and through the main body 102, and into the nozzle filler media flow passages 304. The filler media liner tubes 232 also protect the filler media flow passages against any erosion that could result from filler media flow through the flow passages. Although use of the filler media liner tubes 232 is preferred, it will be appreciated that the wand 100 could be used without the filler media liner tubes 232.

The cable opening 222 in the end cap 106 is adapted to receive an optical cable 236. When the optical cable 236 is inserted into the cable opening 222, it extends through the end cap 106 and is coupled to a cable receptacle 238 mounted within the main body 102. The optical cable 236 is used to transmit laser light from a laser source (not shown) into the main body 102. An optics assembly 250 is mounted within the main body 102 and is used to appropriately collimate and focus the laser light transmitted through the optical cable 236 and receptacle 238, such that the laser light passes through the nozzle aperture 302 and is focused on a point in front of the nozzle aperture 302. For completeness, a brief description of an embodiment of the optics assembly 250 will now be provided.

The optics assembly 250 includes a lens tube 252, a first lens 254, a second lens 256, an optical adjustment screw 258, and a retainer ring stop 262. The lens tube 252 is preferably constructed of, or coated with, a material that is optically inert. For example, in the depicted embodiment, the lens tube 252 is constructed of black anodized aluminum. The first 254 and second 256 lenses are each mounted within the lens tube 252 via appropriate mounting hardware. In particular, each of the lenses 254, 256 is mounted between first and second retaining rings 264, 266. In addition, a lens cover 268 and lens cover spacer 272 are disposed in front of the second lens 256, providing physical protection for the second lens 256. The retainer ring stop 262, as its name connotes, retains the optics assembly 250 within the main body 102. In a particular preferred embodiment, the inner surface of the lens tube 252 and the outer surface of the retainer ring stop 262 are each threaded. Thus, removal of the retaining ring stop 262 allows the lenses 254, 256 to be readily removed from the lens tube 252.

With the above described configuration, laser light transmitted through the optical cable 236 and receptacle 238 passes through the first lens 254, which refracts the laser light so that it travels substantially parallel to the interior surface of the lens tube 252. The parallel laser light then passes through the second lens 256, which focuses the laser light to a point in front of the nozzle aperture 302. It will be appreciated that the location of point in front of the nozzle aperture 302 to which the laser light is focused is a function of the focal length of the second lens 256, and its mounting location within the lens tube 252, which is determined by the second lens' retaining rings 264, 266. It will additionally be appreciated that the spacing of the first lens 254 relative to the optical receptacle 238 affects the collimation of the optics assembly 250. Hence, the optical adjustment screw 258, to which the optical receptacle 238 is coupled, is movably mounted within the lens tube 252, and may be used to adjust the spacing between the first lens 254 and the optical receptacle 238. In a particular preferred embodiment, the inner surface of the lens tube 252 and the outer surface of the optical adjustment screw 258 are each threaded to provide this adjustability function.

The laser light transmitted through the nozzle aperture 302 is used to conduct various types of welding processes on various types, shapes, and configurations of work pieces. In many instances, the work pieces are formed, either in whole or in part, of various materials that require an inert atmosphere at least near the weld pool during welding operations. Thus, the hand-held laser welding wand 100 additionally includes a gas lens assembly 150, which is mounted on the wand main body 102 and surrounds a portion of the nozzle 104. The gas lens assembly 150 is adapted to receive a flow of inert gas from the non-illustrated gas source and is configured, upon receipt upon receipt of the gas, to develop an inert gas atmosphere around the weld pool.

Although the gas lens assembly 150 is shown mounted on the wand main body 102 near the main body first end 108, it will be appreciated that it may be mounted at any one of numerous positions along the wand main body 102. Moreover, while the depicted gas lens assembly 150 is preferably configured to mount on the wand main body 102, it will be appreciated that the gas lens assembly 150 could also be configured to mount on the nozzle 104. A particular embodiment of the gas lens assembly 150 is shown in FIGS. 6–11, and with appropriate reference thereto, will now be described in more detail.

Figure 6:
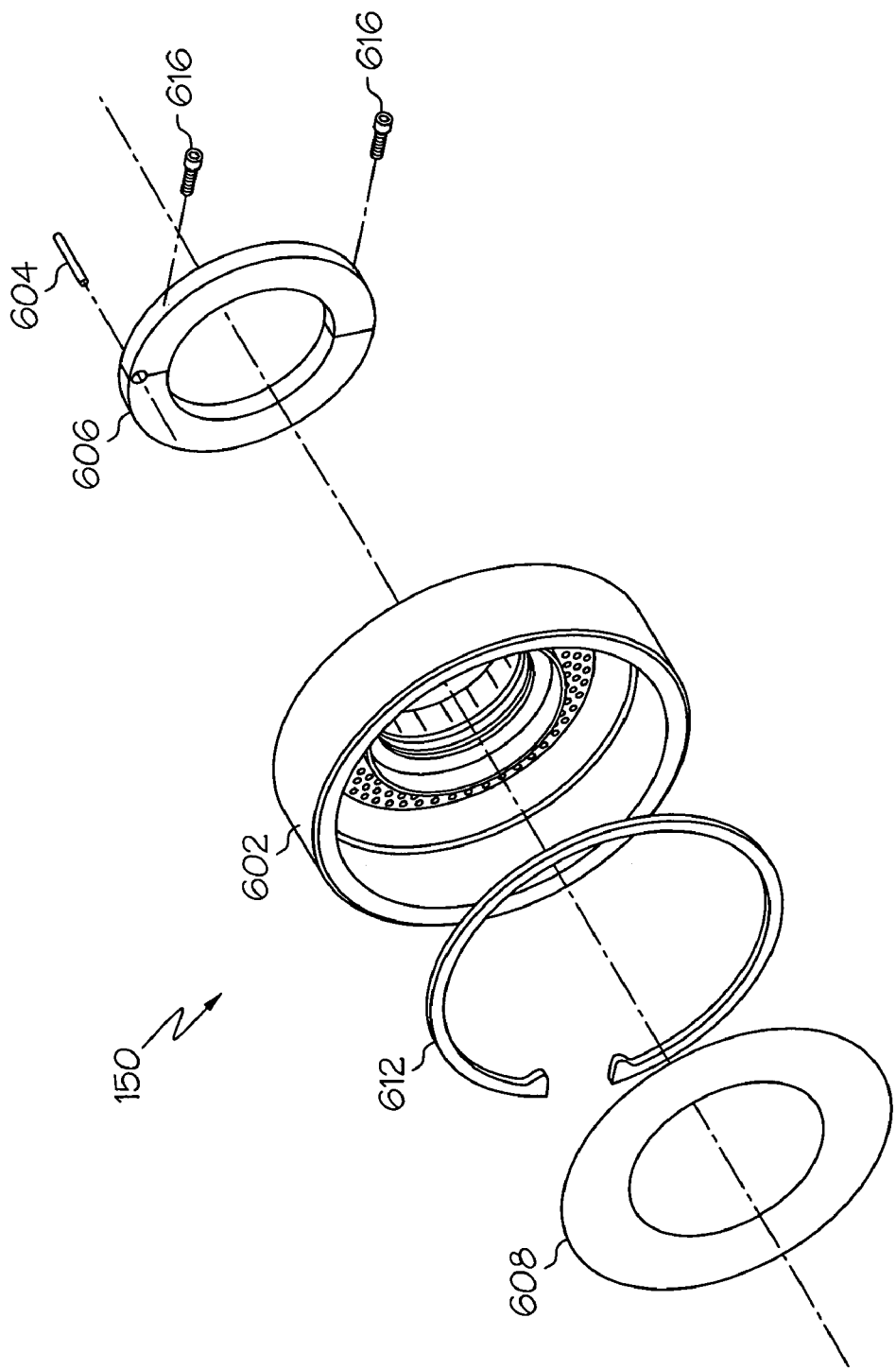
FIG. 6 is a perspective exploded view of a gas lens assembly according to an exemplary embodiment of the present invention that may be used with the laser welding wand shown in FIGS. 1–5.

With reference to first to FIG. 6, it is seen that the gas lens assembly 150 includes a gas lens 602, a gas supply tube 604, a clamp 606, a gas diffusion filter 608, and a retainer ring 612. The gas lens 602, which is shown more clearly in FIGS. 7–10, includes a mount section 702, a gas supply section 704, and a lens section 706. The mount section 702 is configured to mount on the main body 102, and thus, as shown in FIG. 8, includes an inner surface 802 that defines an opening 804. The opening 804 is dimensioned to slide over and around the main body 102. The mount section 702 additionally includes a plurality of slits 708 that extend between the inner peripheral surface 802 and an outer peripheral surface 712 thereof. The slits 708 form a plurality of resilient tangs 714 that resiliently expand, as needed, when the gas lens 602 is slid onto the main body 102. As FIG. 7 also shows, each tang 714 includes a flange 716 that extends radially from an end thereof. The flanges 716 forms a circumferential slot 718 around the mount section 702, between the flanges 716 and the gas supply section 704. As will be described more fully below, the clamp 606 is disposed at least partially within the slot 718.

The gas supply section 704 is coupled to, and extends radially from the mount section 702. The gas supply section 704, as shown more clearly in FIGS. 8–10, includes a back surface 806 and a front surface 902. The back surface 806 includes a gas inlet port 808, which receives the flow of inert gas from the non-illustrated gas source. With quick reference to FIG. 1, it is seen that the gas supply tube 604 is preferably disposed within the gas inlet port (not shown in FIG. 1). The gas supply tube 604 is then preferably coupled to the gas supply source via, for example, a flexible conduit (not shown).

Returning once again to FIGS. 8–10, and with specific reference to FIG. 9, it is seen that the gas supply section front surface 902 is substantially circular in shape and includes a plurality of gas outlet ports 904. The gas outlet ports 904 are preferably evenly spaced, both radially and circumferentially, on the front surface 902. In the depicted embodiment, the plurality of gas outlet ports 904 are evenly spaced about three different radii on front surface 902, thereby forming three different rings of gas outlet ports 904. It will be appreciated that the depicted arrangement of the gas outlet ports 904 is merely exemplary, and that other arrangements could be implemented.

No matter the particular arrangement, each of the gas outlet ports 904 is in fluid communication with the gas inlet port 808. More specifically, and as shown most clearly in FIG. 10, the gas inlet port 808 and each of the gas outlet ports 904 are in fluid communication with an annular groove 1002 that is formed within the gas supply section 704. In the depicted embodiment, the annular groove 1002 extends circumferentially around the gas lens mount section 702 to a radial position that corresponds to the outermost ring of gas outlet ports 904.

Figure 10:
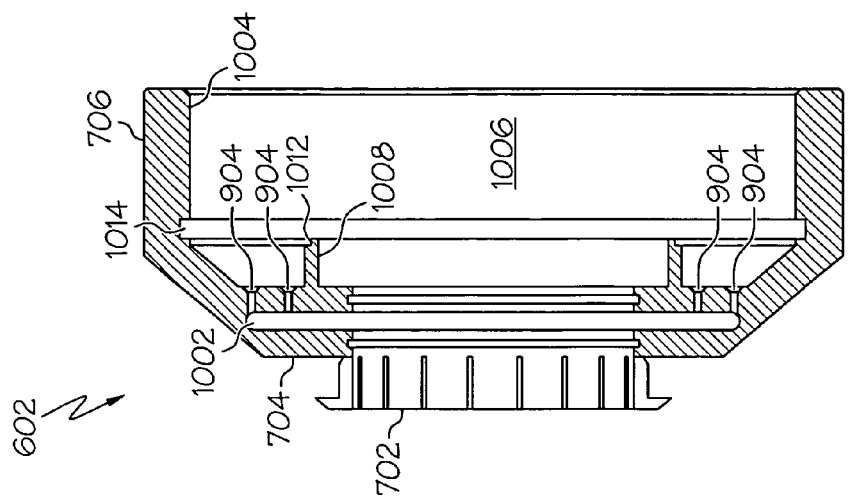
FIG. 10 is a cross section view of the gas lens of FIGS. 7–9, taken along line 10—10 in FIG. 8.
Figure 9:
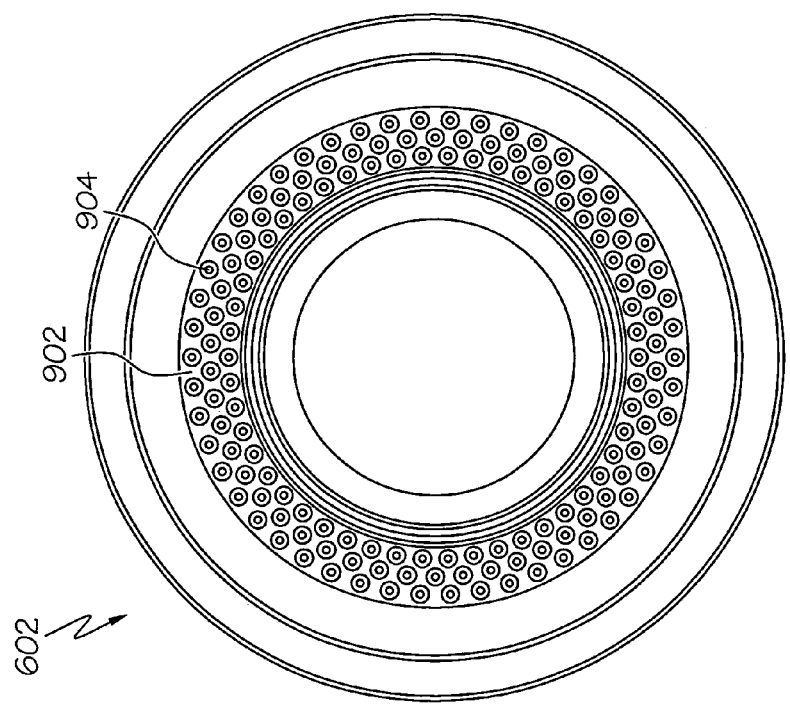

With continued reference to FIG. 10, it is seen that the lens section 706 is coupled to the gas supply section 704 and extends away from the gas supply section 704 in both a radial and an axial direction. The lens section 706 includes an inner peripheral surface 1004 that defines a cavity 1006. The cavity 1006 is in fluid communication with each of the gas outlet ports 904. Thus, the inert gas that exits the gas outlet ports 904 flows into the cavity 1006. As is shown in FIGS. 1, and 3–5, when the gas lens assembly 150 is mounted on the wand 100, the lens section 706 surrounds a portion of the nozzle 104. The lens section 706 directs the inert gas that enters the cavity 1006 toward the surface of the work piece (not shown) and, as was noted above, develops an inert gas atmosphere at least adjacent the nozzle aperture 302. Preferably, the inert gas atmosphere is developed in a predetermined area on the surface of the work piece adjacent the nozzle aperture 302, and most preferably around the weld pool that is formed by the wand 100. It will be appreciated that the lens section 706 may be formed into a variety of shapes, not just the exemplary substantially cylindrical shape shown in FIGS. 6–10. The particular shape may vary to accommodate varying work piece geometries and configurations.

The gas lens 602 is retained on the wand main body 102 via the clamp 606. As was previously noted, and as is shown most clearly in FIGS. 1 and 4, the clamp 606 is disposed within the circumferential slot 718 that is formed in the gas lens mount section 702. The clamp 606, when disposed within the circumferential slot 718, surrounds the gas lens mount section 702, and is configured to supply force to the gas lens mount section 702 that is directed radially inward toward the main body 102. The supplied force, the magnitude of which is adjustable via a plurality of fasteners 616, maintains the gas lens assembly 150 at a desired position on wand main body 102. With reference now to FIGS. 11–13, a more detailed description of the clamp 606 will be provided.

The clamp 606 includes a first clamp section 1102 and a second clamp section 1104. As shown in FIGS. 12 and 13, the first and second clamp sections 1102, 1104 each include a front side 1202, 1302, a back side 1204, 1304, an inner peripheral surface 1206, 1306 that is disposed between the front side 1202, 1302 and the back side 1204, 1304, and an outer peripheral surface 1208, 1308 that is also disposed between the front side 1202, 1302 and the back side 1204, 1304. When the first and second clamp sections 1102, 1104 are disposed within the gas lens mount section circumferential slot 718, the inner peripheral surfaces 1206, 1306 engage the gas lens mount section 702, the front sides 1202, 1302 engage the gas lens gas supply section back surface 806, and the back sides 1204, 1304 engage the tang flanges 716. The outer peripheral surfaces 1206, 1306 are configured to provide a substantially flush surface between the mount section tangs 716 and the lens section 706.

The first and second clamp sections 1102, 1104 also each include a first end 1212, 1312 and a second end 1214, 1314. The first and second ends 1212, 1214, 1312, 1314 are each disposed between the front side 1202, 1302, the back side 1204, 1304, the inner peripheral surface 1206, 1306, and the outer peripheral surface 1208, 1308. The first and second ends 1212, 1214, 1312, 1314 each have an opening 1216, 1218, 1316, 1318 formed therein, through which one of a plurality of fasteners 616 extend. As is shown in FIG. 11, the openings 1216, 1218 in the first clamp section 1102 extend completely through to the outer peripheral surface 1208. Thus, the fasteners 616 extend, one each, through the openings 1216, 1218 in the first clamp section 1102, and then into the openings 1316, 1318 in the second clamp section first and second ends 1312, 1314. It will be appreciated that at least the openings 1316, 1318 in the second clamp section first and second ends 1312, 1314 are threaded, as are each of the fasteners 616, which allows the first and second clamp sections 1102, 1104 to be tightened onto the gas lens mount section 702.

Returning once again to FIG. 6, it was previously noted that the depicted gas lens assembly 150 additionally includes a gas diffusion filter 608 and a retainer ring 612. The gas diffusion filter 608 is disposed within the lens section cavity 1006 downstream of the gas outlet ports 904. More specifically, and with quick reference to FIG. 10, it is seen that an annular filter mount 1008 is coupled to the gas supply section front surface 902, and extends axially therefrom into the lens section cavity 1006. The annular filter mount 1008 has a reduced diameter section 1012 formed on an end thereof. The gas diffusion filter 608 is configured to mount on the reduced diameter section 1012 of the annular filter mount 1008, and is held in place by the retainer ring 612. In particular, and with continued reference to FIG. 10, a retainer groove 1014 is formed in the lens section inner peripheral surface 1004 in a plane that is adjacent the annular filter mount reduced diameter section 1012. The retainer groove 1014 and retainer ring 612 are configured such that a portion of the retainer ring 612 fits within the retainer groove 1014, while a portion of the retainer ring 612 remains exposed and engages the gas diffusion filter 614 when it is mounted on the annular filter mount 1008.

The diffusion filter 608 removes various particulate that may be in the inert gas flow that exits the gas outlet ports 904. The diffusion filter 608 is additionally configured to substantially remove turbulence from the gas flow, to thereby develop an inert gas cloud downstream of the nozzle 104. In the depicted embodiment, the diffusion filter 608 is a porous stainless steel filter having pore sizes that range from about 40 μm to about 80 μm. It will be appreciated that this is merely exemplary, and that the diffusion filter could be formed of various other materials and with pores of any one of numerous other sizes.

In addition to developing an inert gas atmosphere, the gas lens assembly 150 is also preferably configured to reflect laser light and thermal radiation that may be reflected off the work piece. Thus, at least the gas lens 602 is preferably constructed of any one of numerous materials, alloys, or compositions that are substantially impervious to laser light and thermal radiation. The particular material may vary depending, for example, upon the characteristics, such as the wavelength, of the laser, and/or the characteristics of the work piece. However, in the depicted embodiment, the gas lens 602 is constructed of red anodized aluminum.

With the gas lens assembly 150 installed and appropriately positioned on the laser welding wand 100, if a flow of inert gas is directed into the gas inlet port 808, via the gas supply tube 604, the gas lens assembly 150 will develop an inert gas atmosphere around the weld pool developed by the laser light that is directed onto the work piece from the wand 100. Moreover, the laser light that is directed onto the work piece and reflected off the work piece will be intercepted and deflected away from an operator using the wand 100 by the gas lens assembly 150. This will help guard against a user of the wand 100 absorbing laser light that may be reflected off a work piece, as well as significantly reduce any heat that might be transferred to the wand 100 as a result of the reflected laser light.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A hand-held laser fusion welding assembly for treating a workpiece, comprising:
   a main body dimensioned to be grapsed by a hand and adapted to couple to at least a laser delivery system;
   a nozzle coupled to the main body and having an aperture through which laser light from the laser delivery system may pass; and
   a gas lens coupled to the main body and surrounding at least a portion of the nozzle, the gas lens adapted to receive a flow of inert gas from an inert gas delivery system and configured, upon receipt thereof, to develop an inert gas atmosphere at least adjacent the nozzle aperture, the as lens comprising:
   a mount section coupled to the main body,
   a gas supply section coupled to the mount section and extending radially therefrom, the gas supply section having a gas inlet port adapted to receive the flow of inert gas, and a plurality of gas outlet ports in fluid communication with the gas inlet port through which the flow of inert gas passes, and
   a lens section coupled to the gas supply section and extending axially therefrom, the lens section having an inner peripheral surface that at least partially surrounds the nozzle and that defines a cavity with which each of the gas outlet ports is in fluid communication.

2. The assembly of claim 1, wherein the mount section includes:
   an inner peripheral surface and an outer peripheral surface; and a plurality of slits evenly spaced around the mount section and extending between the inner and outer peripheral surfaces thereof.

3. The assembly of claim 1, wherein the gas lens further comprises:
   a clamp configured to at least partially surround the mount section supply an adjustable force thereto that is directed toward the main body.

4. The assembly of claim 3, wherein the clamp comprises:
   a first clamp section having a front side, a back side, an inner peripheral surface disposed between the front side and the back side, an outer peripheral surface disposed between the front side and the back side, a first end disposed between the front and back sides and the inner and outer peripheral surfaces, and a second end disposed between the front and back sides and the inner and outer peripheral surfaces, the first and second ends each having openings therein;
   a second clamp section having a front side, a back side, an inner peripheral surface disposed between the front side and the back side, an outer peripheral surface disposed between the front side and the back side, a first end disposed between the front and back sides and the inner and outer peripheral surfaces, and a second end disposed between the front and back sides and the inner and outer peripheral surfaces, the first and second ends each having openings therein;
   a plurality of fasteners coupled to the first and second clamp sections, each fastener disposed within one of the openings in one of the first clamp section ends and one of the openings in the second clamp section ends.

5. The assembly of claim 4, wherein each fastener is configured to move the first and second clamp sections relative to one another to thereby vary a magnitude of the force supply to the mount section.

6. The assembly of claim 1, wherein the gas supply section includes an annular groove formed therein, the annular groove in fluid communication between the gas inlet port and the plurality of gas outlet ports.

7. The assembly of claim 1, wherein:
   the gas supply section includes a front side and a back side;
   the gas inlet port is disposed on the gas supply section back side; and
   the plurality of gas outlet ports are disposed on the gas supply section front side.

8. The assembly of claim 7, wherein:
   the gas supply section front side is substantially circular; and
   the plurality of gas outlet ports are evenly spaced, both radially and circumferentially around a portion of the gas supply section front side.

9. The assembly of claim 7, further comprising:
   an annular filter mount extending from the gas supply section front side into the lens section cavity;
   a gas diffusion filter mounted on the filter mount.

10. The assembly of claim 9, further comprising:
    a retainer ring coupled to the lens section inner peripheral surface and configured to retain the diffusion filter on the filter mount.

11. The assembly of claim 10, further comprising:
    a groove formed in the lens section inner peripheral surface,
    wherein the retainer ring is disposed at least partially within the groove.

12. The assembly of claim 1, further comprising:
    a diffusion filter disposed within the lens section and positioned fluidly downstream of the gas outlet ports, the diffusion filter configured to remove particulate from inert gas of and to substantially reduce turbulence in the flow of inert gas.

13. The assembly of claim 12, further comprising:
    a retainer ring disposed within the lens section and configured to retain the diffusion filter therein.

14. The assembly of claim 1, further comprising:
    a gas supply tube disposed at least partially within the gas inlet port and configured to receive the flow of inert gas.

15. The assembly of claim 1, wherein the gas lens is configured to be movable on, and removable from, the main body.

16. The assembly of claim 1, wherein the gas lens is constructed at least partially of a material that reflects at least a portion of the laser light that passes through the nozzle aperture and is reflected by the workpiece.

17. The assembly of claim 16, wherein:
    the reflected laser light is characterized by at least a wavelength; and
    the material of which the gas lens is at least partially constructed has low absorption characteristics at the reflected laser light wavelength.

18. The assembly of claim 17, wherein the gas lens is further configured and constructed to diffusely reflect the laser light reflected by the workpiece.

19. A device for developing an inert gas atmosphere proximate a nozzle that is coupled to an end of a hand-held laser welding wand, comprising:
    a gas lens adapted to mount on the hand-held laser welding wand and, when mounted thereon, to surround at least a portion of the nozzle, the gas lens adapted to receive a flow of inert gas from an inert gas delivery system and configured, upon receipt thereof, to develop the inert gas atmosphere, the gas lens comprising:
a mount section coupled to the main body,
a gas supply section coupled to the mount section and extending radially therefrom, the gas supply section having a gas inlet port adapted to receive the flow of inert gas, and a plurality of gas outlet ports in fluid communication the gas inlet port through which the flow of inert gas passes, and
a lens section coupled to the gas supply section and extending axially therefrom, the lens section an inner peripheral surface that at least partially surrounds the nozzle and that defines a cavity with which each of the gas outlet ports is in fluid communication.

20. The device of claim 19, wherein the mount section includes:
an inner peripheral surface and an outer peripheral surface; and
a plurality of slits evenly spaced around the mount section and extending between the inner and outer peripheral surfaces thereof.

21. The device of claim 19, wherein the gas lens further comprises:
a clamp configured to at least partially surround the mount section supply an adjustable force thereto that is directed toward the main body.

22. The device of claim 21, wherein the clamp comprises:
a first clamp section having a front side, a back side, an inner peripheral surface disposed between the front side and the back side, an outer peripheral surface disposed between the front side and the back side, a first end disposed between the front and back sides and the inner and outer peripheral surfaces, and a second end disposed between the front and back sides and the inner and outer peripheral surfaces, the first and second ends each having openings therein;
a second clamp section having a front side, a back side, an inner peripheral surface disposed between the front side and the back side, an outer peripheral surface disposed between the front side and the back side, a first end disposed between the front and back sides and the inner and outer peripheral surfaces, and a second end disposed between the front and back sides and the inner and outer peripheral surfaces, the first and second ends each having openings therein;
a plurality of fasteners coupled to the first and second clamp sections, each fastener disposed within one of the openings in one of the first clamp section ends and one of the openings in the second clamp section ends.

23. The device of claim 22, wherein each fastener is configured to move the first and second clamp sections relative to one another to thereby vary a magnitude of the force supply to the mount section.

24. The device of claim 19, wherein the gas supply section includes an annular groove formed therein, the annular groove in fluid communication between the gas inlet port and the plurality of gas outlet ports.

25. The device of claim 19, wherein:
the gas supply section includes a front side and a back side;
the gas inlet port is disposed on the gas supply section back side; and
the plurality of gas outlet ports are disposed on the gas supply section front side.

26. The device of claim 25, wherein:
the gas supply section front side is substantially circular; and
the plurality of gas outlet ports are evenly spaced, both radially and circumferentially around a portion of the gas supply section front side.

27. The device of claim 25, further comprising:
an annular filter mount extending from the gas supply section front side into the lens section cavity;
a gas diffusion filter mounted on the filter mount.

28. The device of claim 27, further comprising:
a retainer ring coupled to the lens section inner peripheral surface and configured to retain the diffusion filter on the filter mount.

29. The device of claim 28, further comprising:
a groove formed in the lens section inner peripheral surface,
wherein the retainer ring is disposed at least partially within the groove.

30. The device of claim 19, further comprising:
a diffusion filter disposed within the lens section and positioned fluidly downstream of the gas outlet ports, the diffusion filter configured to remove particulate from inert gas of and to substantially reduce turbulence in the flow of inert gas.

31. The device of claim 30, further comprising:
a retainer ring disposed within the lens section and configured to retain the diffusion filter therein.

32. The device of claim 19, further comprising:
a gas supply tube disposed at least partially within the gas inlet port and configured to receive the flow of inert gas.

33. The device of claim 19, wherein the gas lens is configured to be movable on, and removable from, the main body.

34. The device of claim 19, wherein the gas lens is constructed at least partially of a material that reflects at least a portion of the laser light that passes through the nozzle aperture and is reflected by the workpiece.

35. The device of claim 34, wherein:
the reflected laser light is characterized by at least a wavelength; and
the material of which the gas lens is at least partially constructed has low absorption characteristics at the reflected laser light wavelength.

36. The device of claim 35, wherein the gas lens is further configured and constructed to diffusely reflect the laser light reflected by the workpiece.

* * * * *

UNITED STATES PATENT AND TRADEMARK OFFICE
CERTIFICATE OF CORRECTION

| | | |
|---|---|---|
| PATENT NO. | : 7,112,761 B2 | Page 1 of 1 |
| APPLICATION NO. | : 11/053319 | |
| DATED | : September 26, 2006 | |
| INVENTOR(S) | : Hughes et al. | |

It is certified that error appears in the above-identified patent and that said Letters Patent is hereby corrected as shown below:

Column 9, line 15 Claim 1, "as" should be changed to --gas--;
Column 11, line 8 Claim 19, "communication the" should be changed to --communication with the--;
Column 11, line 11 Claim 19, "section an" should be changed to --section having an--.

Signed and Sealed this

Fifteenth Day of May, 2007

JON W. DUDAS
*Director of the United States Patent and Trademark Office*